United States Patent
Fu et al.

(10) Patent No.: US 10,270,614 B2
(45) Date of Patent: Apr. 23, 2019

(54) METHOD AND DEVICE FOR CONTROLLING TIMED TASK

(71) Applicant: Beijing Xiaomi Mobile Software Co., Ltd., Beijing (CN)

(72) Inventors: Qiang Fu, Beijing (CN); Hong Chen, Beijing (CN); Enxing Hou, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/654,717

(22) Filed: Jul. 20, 2017

(65) Prior Publication Data
US 2018/0048480 A1 Feb. 15, 2018

(30) Foreign Application Priority Data
Aug. 11, 2016 (CN) .......................... 2016 1 0659781

(51) Int. Cl.
| | |
|---|---|
| *H04L 12/28* | (2006.01) |
| *H04L 29/06* | (2006.01) |
| *G08C 17/02* | (2006.01) |
| *H04W 4/00* | (2018.01) |
| *H04W 4/80* | (2018.01) |
| *H04W 4/02* | (2018.01) |

(52) U.S. Cl.
CPC ............ *H04L 12/282* (2013.01); *G08C 17/02* (2013.01); *H04L 63/0853* (2013.01); *H04W 4/008* (2013.01); *H04W 4/80* (2018.02); *G08C 2201/60* (2013.01); *G08C 2201/93* (2013.01); *H04L 12/2803* (2013.01); *H04W 4/023* (2013.01)

(58) Field of Classification Search
CPC ............ G07C 2209/08; G07C 9/00309; G07C 9/00103; G07C 9/00571; G07C 9/00896; G07C 2009/00793; G07C 9/00817
USPC ......................................................... 340/5.28
See application file for complete search history.

(56) References Cited

U.S. PATENT DOCUMENTS

2016/0224043 A1* 8/2016 Liu ....................... H04L 67/125

FOREIGN PATENT DOCUMENTS

| CN | 103152705 A | 6/2013 |
|---|---|---|
| CN | 103198851 A | 7/2013 |
| CN | 103648224 A | 3/2014 |
| CN | 104868326 A | 8/2015 |

(Continued)

OTHER PUBLICATIONS

Extended European Search Report from EPO for EP application No. 17153640 dated May 16, 2017.

(Continued)

*Primary Examiner* — Mark Blouin
(74) *Attorney, Agent, or Firm* — Jun He Law Offices P.C.; James J. Zhu (57) ABSTRACT

A method and a device for controlling a timed task are provided. The method applied in a first apparatus includes: receiving the timed task, wherein the timed task carries an execution time of the timed task; and sending the timed task to a second apparatus before the execution time of the timed task. The method applied in a second apparatus includes: receiving a timed task sent by a first apparatus; and executing the timed task in response to the execution time.

12 Claims, 6 Drawing Sheets

(56) References Cited

FOREIGN PATENT DOCUMENTS

| | | |
|---|---|---|
| CN | 105138598 A | 12/2015 |
| CN | 105516222 A | 4/2016 |
| WO | 2014027349 A1 | 2/2014 |

OTHER PUBLICATIONS

International Search Report and written opinions of PCT application No. PCT/CN2016/106794.

\* cited by examiner

METHOD AND DEVICE FOR CONTROLLING TIMED TASK

CROSS-REFERENCE TO RELATED APPLICATION

The present application is based on and claims the priority of Chinese patent application No. 201610659781.4, filed on Aug. 11, 2016, the entire content of which is incorporated herein by reference.

TECHNICAL FIELD

The present disclosure generally relates to a communication technology field, and more particularly relates to a method and a device for controlling a timed task.

BACKGROUND

In recent years, with continuous development of smart home technology, smart home apparatuses become more popular, and the rising popularity of smart home apparatuses has brought more and more conveniences for people's life. Currently, most smart home apparatuses possess a timing switch function, for example, a smart socket can be set in a power supply state from 8:00 to 9:00, and in a power off state at other times during the day.

Typically, a timed task is pre-stored in a Cloud Server, and when the time for executing the timed task arrives, the server sends a timed task execution instruction to the smart home apparatus for controlling the smart home apparatus to execute the above timed task. However, if the communication between the server and the smart home apparatus fails at this moment, the above timed task execution instruction cannot be sent to the smart home apparatus, which causes the smart home apparatus to fail to execute the above timed task. Thus, there is a need to provide a method for controlling timed task with a relatively high success rate.

SUMMARY

According to a first aspect of embodiments of the present disclosure, a method for controlling a timed task applied in a first apparatus is provided. The method includes: receiving the timed task, wherein the timed task carries an execution time of the timed task; and sending the timed task to a second apparatus before the execution time of the timed task.

According to a second aspect of embodiments of the present disclosure, a method for controlling a timed task applied in a second apparatus is provided. The method includes: receiving the timed task sent by a first apparatus, wherein the timed task carries an execution time of the timed task; and executing the timed task in response to the execution time.

According to a third aspect of embodiments of the present disclosure, a device for controlling a timed task is provided. The device includes: a processor; and a memory, configured to store instructions executable by the processor; wherein the processor is configured to: receive the timed task, wherein the timed task carries an execution time of the timed task; and send the timed task to a second apparatus before the execution time of the timed task.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used herein in the description of the present disclosure are only for the purpose of describing specific embodiments, but should not be construed to limit the present disclosure. As used in the description of the present disclosure and the appended claims, "a", "the" and "this" in singular forms mean including plural forms, unless clearly indicated in the context otherwise. It should also be understood that, as used herein, the term "and/or" represents and contains any one and all possible combinations of one or more associated listed items.

Although terms such as "first", "second" and "third" are used herein for describing various information, these information should not be limited by these terms. These terms are only used for distinguishing same kind of information from each other. For example, first information may also be called second information, and similarly, the second information may also be called first information, without departing from the scope of the present disclosure. As used herein, the term "if" may be construed to mean "when" or "upon" or "in response to determining", depending on the context.

In recent years, with continuous development of smart home technology, smart home apparatuses become more popular, and the rising popularity of smart home apparatuses has brought more and more conveniences for people's life. Currently, most smart home apparatuses possess a timing switch function, for example, a smart socket can be set in a power supply state from 8:00 to 9:00, and in a power off state at other times during the day.

Typically, a timed task is pre-stored in a Cloud Server, when the time for executing the timed task arrives, the server sends a timed task execution instruction to the smart home apparatus for controlling the smart home apparatus to execute the above timed task. However, if the communication between the server and the smart home apparatus fails at this moment, the above timed task execution instruction cannot be sent to the smart home apparatus, which causes the smart home apparatus to fail to execute the above timed task. Thus, a method for controlling a timed task with a relatively high success rate is needed. Thus, the present disclosure provides a method and a device for controlling a timed task Firstly, a method for controlling a timed task, applied in a first apparatus, is provided by the present disclosure and is introduced below.

Figure 1:
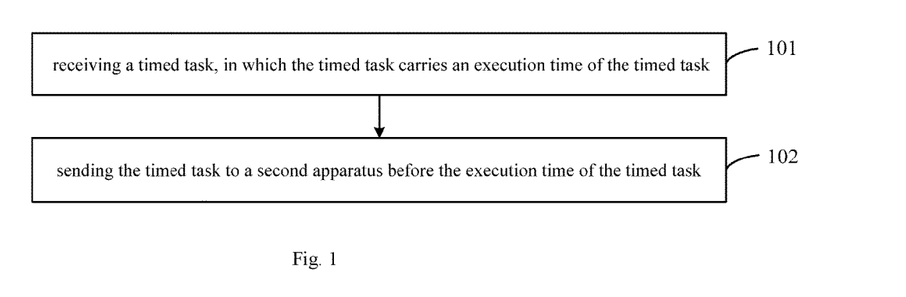
FIG. 1 is a flow chart of a method for controlling a timed task according to an exemplary embodiment of the present disclosure.

FIG. 1 is a flow chart of a method for controlling a timed task according to an exemplary embodiment of the present disclosure. As shown in FIG. 1, the method is applied in a first apparatus, and the method may include the following steps.

In step 101, a timed task is received, in which the timed task carries an execution time of the timed task.

The timed task in the present embodiment is a task set by a user for a second apparatus, and the user may set a time for the second apparatus to execute the above task, such that the second apparatus executes the timed task at a specified time set by the user. The second apparatus in the present embodiment may be any smart home apparatus in home environments (such as a smart socket, an intelligent air conditioner, an intelligent refrigerator, an intelligent water heater, and an intelligent electric rice cooker). Of course, the second apparatus may also be other electronic apparatuses beyond smart home environments, which shall not be limited in the present embodiment.

On the basis of the smart home environment, the timed task in the present embodiment may be any operation executable by the smart home apparatus in the smart home environment, for example, switching on or off of a smart socket within a certain period of time, water heating of an intelligent water heater, rice cooking time of an intelligent electric rice cooker, which shall not be limited in the present embodiment.

In step 102, the timed task is sent to the second apparatus before the execution time of the timed task.

It should be understood that to enable the second apparatus to execute the above timed task, the first apparatus needs to send the above timed task to the second apparatus after receiving the timed task.

In consideration of the volatility of network (i.e., sometimes the network is unblocked and sometimes the network is congested), there may be a failure of sending the timed task if the timed task is sent to the second apparatus only once. In addition, sometimes there may be a failure in the second apparatus, which also results in a failure of sending the timed task. On the basis of the above situations, according to the present embodiment, a period of time may be set aside before the execution time of the timed task arrives to cope with the above situations that may cause a failure of sending the timed task. In an embodiment, the first apparatus may send the timed task to the second apparatus before the execution time of the timed task arrives.

In an embodiment, the first apparatus in the present embodiment may send the timed task to the second apparatus repeatedly. Specifically, in an example, a sending period is set, and the first apparatus sends the above timed task to the second apparatus once every sending period. In another example, the first apparatus sends the above timed task to the second apparatus repeatedly at a random time interval (i.e., the time interval of the sending operation is not fixed), which shall not be limited in the embodiment.

It can be seen from the above embodiment that, the first apparatus in the embodiment may send the timed task to the second apparatus before the execution time of the timed task arrives. Compared with a situation in which a Cloud Server sends the timed task only when the execution time of the timed task arrives, a period of time may be set aside before the execution time of the timed task arrives in the present embodiment, and during this period of time, the above timed task may be sent repeatedly or network failures may be examined, so as to ensure that the timed task may be sent to the second apparatus successfully, thus improving the success rate of sending the timed task.

On the basis of the embodiment shown in FIG. 1, the first apparatus in the present embodiment may include at least one of a server and an intelligent router.

In a possible implementation, if the first apparatus in the present embodiment is a server, the above step 101 may include: receiving a timed task sent by a control terminal, in which the control terminal is configured to provide a user with an interface for inputting the timed task.

The control terminal in the present embodiment may include a smartphone, a tablet PC, etc., and the user inputs a task which needs to be executed by the second terminal, and the execution time of the task and the like in the control terminal.

Figure 2:
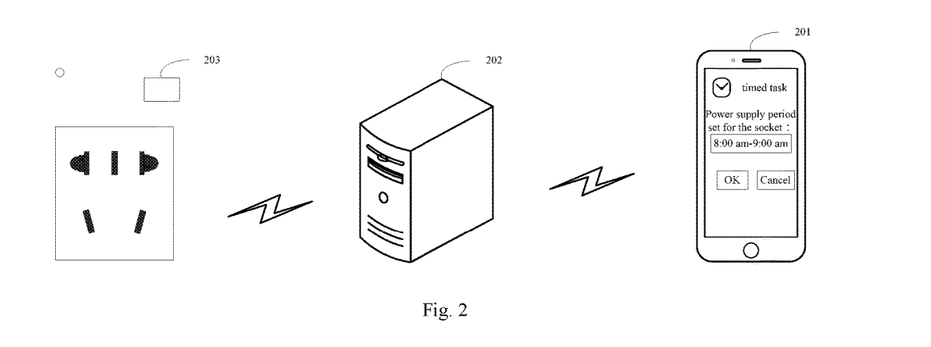
FIG. 2 is a schematic diagram showing an application scene of a method for controlling a timed task according to an exemplary embodiment of the present disclosure.

For ease of understanding, the implementation is explained below in combination with the application scene shown in FIG. 2. FIG. 2 is a schematic diagram showing an application scene of a method for controlling a timed task according to an exemplary embodiment of the present disclosure. As shown in FIG. 2, the application scene includes a smartphone 201, a server 202 and a smart socket 203, wherein, the server is the first apparatus, the smart socket is the second apparatus, and the smartphone is the control terminal.

The user inputs a task type that the smart socket needs to execute in the display screen of the smartphone. In this case, the task type is power supply, and the time period in which the smart socket executes a power supply task is 8:00-9:00 a.m. The smartphone sends the timed task about the smart socket inputted by the user to the server, and the server sends the above timed task to the smart socket repeatedly after receiving the timed task about the smart socket, such that it is ensured that the timed task is stored in the smart socket before the execution time of the above timed task arrives, and the smart socket can execute a power supply operation when the execution time of the above timed task arrives.

In another possible implementation, if the first apparatus in the present embodiment is an intelligent router, the intelligent router is communicatively connected with the server, in which the server is stored with a timed task; and the above step 101 may include: receiving the timed task sent by the server.

In consideration of a situation in which the communication between the second apparatus and the server is blocked and the timing information cannot be sent, and in consideration of a fact that a communication state between the second apparatus and the intelligent router in a same home environment (i.e., the communication state between two electronic apparatuses in an intranet) is generally better than a communication state between electronic apparatuses in an extranet, in the present embodiment, the server may choose to send the timed task to an intelligent router in the user's home, such that the intelligent router stores the above timed task, and sends the timed task to the second apparatus when the second apparatus can normally communicate with the intelligent router.

Figure 3:
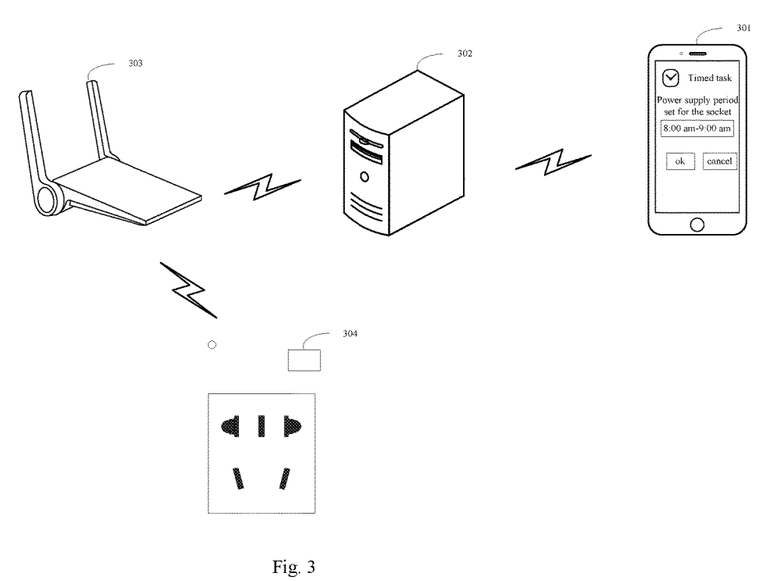
FIG. 3 is a schematic diagram showing an application scene of a method for controlling a timed task according to another exemplary embodiment of the present disclosure.

For ease of understanding, the present embodiment is explained below in combination with the application scene shown in FIG. 3. FIG. 3 is a schematic diagram showing an application scene of a method for controlling a timed task according to an exemplary embodiment of the present disclosure. As shown in FIG. 3, the application scene includes a smartphone 301, a server 302, an intelligent router 303 and a smart socket 304, in which the intelligent router is the first apparatus, the smart socket is the second apparatus, and the smartphone is the control terminal.

The user inputs a task type that the smart socket needs to execute in the display screen of the smartphone. In this case, the task type is power supply, and the time period in which the smart socket executes a power supply task is 8:00-9:00 a.m. The smartphone sends the timed task about the smart socket inputted by the user to the server, the server sends the timed task to the intelligent router after receiving the timed task about the smart socket, and the intelligent router sends the timed task to the smart socket repeatedly, such that it is ensured that the smart socket stores the timed task in local before the execution time of the above timed task arrives and executes a power supply operation when the execution time of the above timed task arrives.

It can be seen from the above embodiment that, the server in the present embodiment may send the timed task to the intelligent router, such that the intelligent router stores the above timed task, and sends the timed task to the second apparatus once the intelligent router can be communicatively connected with the second apparatus, which avoids a failure of sending the timed task caused by the instability of external network environment as much as possible.

Corresponding to the method for controlling a timed task applied in the first apparatus shown in FIG. 1, the present disclosure further provides a method for controlling a timed task applied in a second apparatus, and the method is introduced below.

Figure 4:
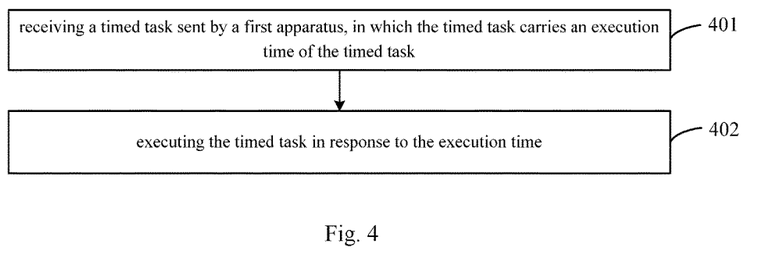
FIG. 4 is a flow chart of a method for controlling a timed task according to another exemplary embodiment of the present disclosure.

FIG. 4 is a flow chart showing a method for controlling a timed task according to another exemplary embodiment of the present disclosure. As shown in FIG. 4, the method is applied in a second apparatus, and the method may include the following steps.

In step 401, a timed task sent by a first apparatus is received, in which the timed task carries an execution time of the timed task.

The second apparatus in the present embodiment may be any smart home apparatus in home environments (such as a smart socket, an intelligent air conditioner, an intelligent refrigerator, an intelligent water heater, and an intelligent electric rice cooker). Of course, the second apparatus may also be other electronic apparatuses beyond smart home environments, which shall not be limited in the present embodiment.

The timed task in the present embodiment is a task set by a user for the second apparatus, and the user may set a time for the second apparatus to execute the task, such that the second apparatus executes the timed task at a specified time set by the user. The timed task in the present embodiment may be any operation executable by a smart home apparatus in the smart home environment, for example, switching on or off of a smart socket within a certain period of time, water heating of an intelligent water heater, a rice cooking time of an intelligent electric rice cooker, which shall not be limited in the embodiment.

The first apparatus in the present embodiment may include at least one of a server and an intelligent router.

In step 402, the timed task is executed in response to the execution time.

It can be seen from the above embodiment that, the second apparatus in the present embodiment may store the timed task carrying the execution time in local, and execute the corresponding timed task when the above execution time arrives. Compared with the smart home apparatus which executes the task immediately after receiving the task execution instruction, the second apparatus in the present embodiment delays the execution for a period of time after receiving the timed task. That is, the second apparatus executes the timed task when the execution time of the timed task arrives.

Figure 5:
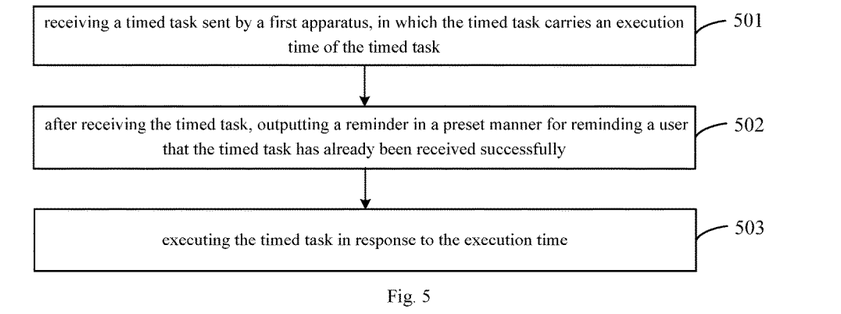
FIG. 5 is a flow chart of a method for controlling a timed task according to another exemplary embodiment of the present disclosure.

FIG. 5 is a flow chart showing a method for controlling a timed task according to another exemplary embodiment of the present disclosure. As shown in FIG. 5, the method is applied in a second apparatus, and the method may include the following steps.

In step 501, a timed task sent by the first apparatus is received, in which the timed task carries an execution time of the timed task.

Step 501 and following step 503 in the present embodiment are similar to step 401 and step 402 in the embodiment shown in FIG. 4 respectively, which shall not be elaborated in the present embodiment, and reference may be made to step 401 and step 402 in the embodiment shown in FIG. 4.

In step 502, after the timed task is received, a reminder is outputted in a preset manner for reminding a user that the timed task has already been received successfully.

The second apparatus in the present embodiment may be configured with a light-emitting module or a voice output module. Taking a smart socket as an example, the smart socket in the present embodiment may be configured with a LED lamp or a trumpet. When the timed task is received, the smart socket may remind the user that the timed task has already been received successfully by means of emitting light by the LED lamp or making a sound by the trumpet.

Figure 6:
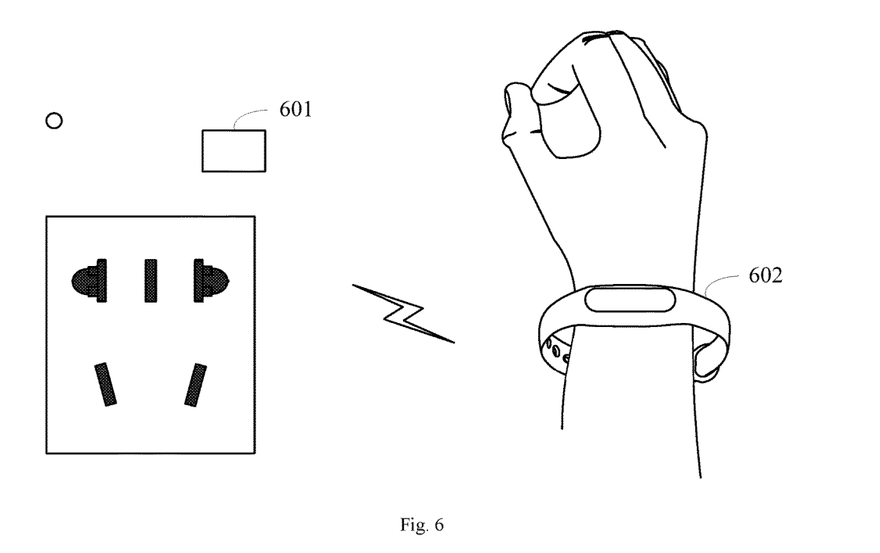
FIG. 6 is a schematic diagram showing an application scene of a method according to another exemplary embodiment of the present disclosure.

The second apparatus in the present embodiment may also be communicatively connected with a wearable and portable apparatus, such as a smart bracelet. As shown in FIG. 6, the application scene includes a smart socket 601, and a smart bracelet 602, in which the smart socket 601 is communicatively connected with the smart bracelet 602, and the smart socket 601 is the second apparatus. When the smart socket receives the timed task, the smart socket may remind the user that the timed task has already been received successfully by controlling the smart bracelet to vibrate.

In step 503, the timed task is executed in response to the execution time.

It can be seen from the above embodiment that, the second apparatus in the present embodiment may inform the user that the timed task has already been received successfully after receiving the timed task. If the user has not received the above notification information yet after a period of time, the user may examine the reason why the timed task is not received by the second apparatus in time.

It should be noted that, although the operations of the present disclosure are described in a specific sequence in the appended drawings, this doesn't require or hint that these operations must be executed in this specific sequence or all operations shown in the appended drawings must be executed to realize the expected results. Instead, the sequence of the steps drawn in the flow chart may be changed. Additionally or alternatively, certain steps may be omitted, several steps may be merged into one step to be executed, and/or one step may be deconstructed into several steps to be executed.

Corresponding to the embodiment of the method for controlling a timed task applied in a first apparatus as shown in FIG. 1, the present disclosure further provides an embodiment of a device for controlling a timed task applied in the first apparatus.

Figure 7:
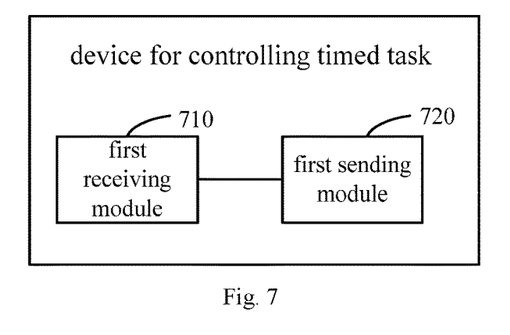
FIG. 7 is a block diagram of a device for controlling a timed task according to an exemplary embodiment of the present disclosure.

FIG. 7 is a block diagram showing a device for controlling a timed task according to an exemplary embodiment of the present disclosure. As shown in FIG. 7, the device is applied in the first apparatus, and the device may include a first receiving module 710 and a first sending module 720.

The first receiving module 710 is configured to receive the timed task, in which the timed task carries an execution time of the timed task.

The first sending module 720 is configured to send the timed task to a second apparatus before the execution time of the timed task received by the first receiving module 710.

It can be seen from the above embodiment that, the first apparatus in the present embodiment may send the timed task to the second apparatus before the execution time of the timed task arrives. Compared with a situation in which a Cloud Server sends the timed task only when the execution time of the timed task arrives, a period of time may be set aside before the execution time of the timed task arrives in the present embodiment. During this period of time, the above timed task may be sent repeatedly or network failures may be examined, so as to ensure that the timed task may be sent to the second apparatus successfully, thus improving the success rate of sending the timed task.

In another embodiment provided by the present disclosure, based on the embodiment shown in FIG. 7, the first apparatus may include at least one of a server and an intelligent router.

Figure 8:
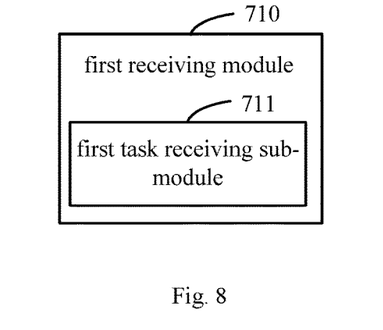
FIG. 8 is a block diagram of a device for controlling a timed task according to another exemplary embodiment of the present disclosure.

FIG. 8 is a block diagram showing a device for controlling a timed task according to another exemplary embodiment of the present disclosure. As shown in FIG. 8, the embodiment may be based on the last embodiment, and the first apparatus is a server.

The first receiving module 710 may include a first task receiving sub-module 711, and the first task receiving sub-module 711 is configured to receive a timed task sent by a control terminal, in which the control terminal is configured to provide a user with an interface for inputting the timed task.

Figure 9:
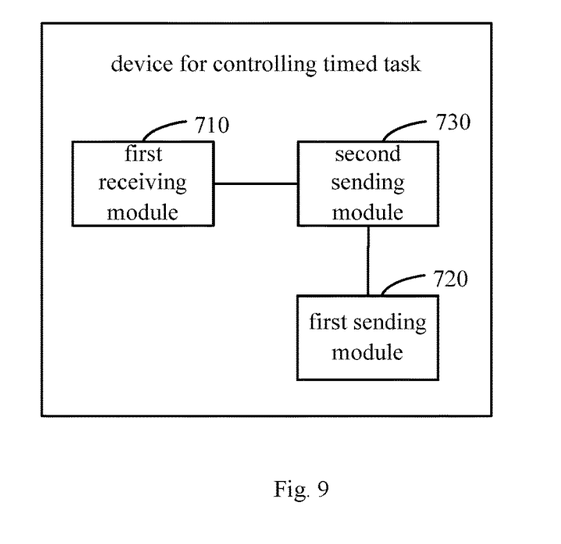
FIG. 9 is a block diagram of a device for controlling a timed task according to another exemplary embodiment of the present disclosure.

FIG. 9 is a block diagram showing a device for controlling a timed task according to another exemplary embodiment of the present disclosure. As shown in FIG. 9, the embodiment may be based on the embodiment shown in FIG. 8, and the device may further include a second sending module 730.

The second sending module 730 is configured to send the timed task to the intelligent router that is in a same home environment as the second apparatus before the execution time of the timed task received by the first receiving module 710.

Figure 10:
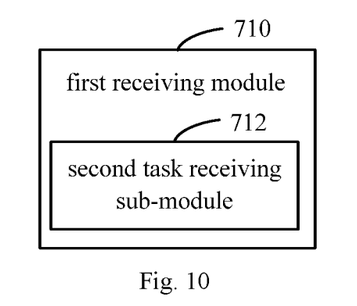
FIG. 10 is a block diagram of a device for controlling a timed task according to another exemplary embodiment of the present disclosure.

FIG. 10 is a block diagram showing a device for controlling a timed task according to another exemplary embodiment of the present disclosure. As shown in FIG. 10, the first apparatus is an intelligent router, and the intelligent router is communicatively connected with the server, in which the server is stored with a timed task.

The first receiving module 710 may include a second task receiving sub-module 712 configured to receive the timed task sent by the server.

Figure 11:
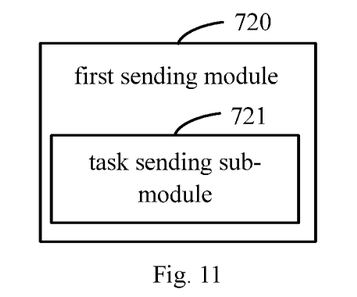
FIG. 11 is a block diagram of a device for controlling a timed task according to another exemplary embodiment of the present disclosure.

FIG. 11 is a block diagram showing a device for controlling a timed task according to another exemplary embodiment of the present disclosure. As shown in FIG. 11, the present embodiment may be based on any one of embodiments shown in FIG. 7 to FIG. 10, and the first sending module 720 may include a task sending sub-module 721.

The task sending sub-module 721 is configured to send the timed task to the second apparatus repeatedly before the execution time of the timed task received by the first receiving module 710.

Corresponding to the embodiment of the method for controlling a timed task applied in a second apparatus shown in FIG. 4, the present disclosure further provides an embodiment of a device for controlling a timed task applied in a second apparatus.

Figure 12:
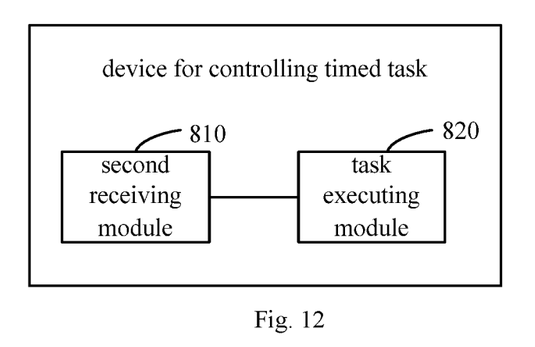
FIG. 12 is a block diagram of a device for controlling a timed task according to another exemplary embodiment of the present disclosure.

FIG. 12 is a block diagram showing a device for controlling a timed task according to another exemplary embodiment of the present disclosure. As shown in FIG. 12, the device is applied in the second apparatus, and the device may include a second receiving module 810 and a task executing module 820.

The second receiving module 810 is configured to receive a timed task sent by a first apparatus, in which the timed task carries an execution time of the timed task.

The task executing module 820 is configured to execute the timed task received by the second receiving module 810 in response to the execution time.

It can be seen from the above embodiment that, the second apparatus in the present embodiment may store the timed task carrying the execution time in local, and execute the corresponding timed task when the above execution time arrives. Compared with the smart home apparatus which executes the task immediately after receiving the task execution instruction, the second apparatus in the present embodiment delays the execution for a period of time after receiving the timed task. That is, the second apparatus executes the timed task when the execution time of the timed task arrives.

Figure 13:
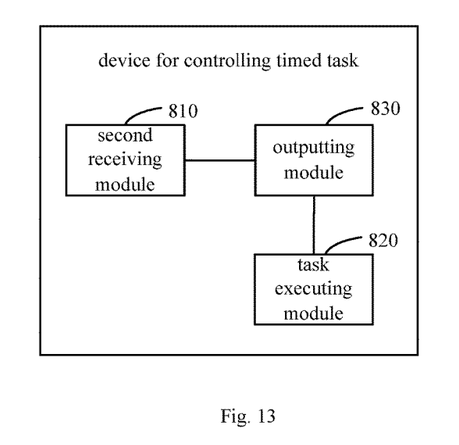
FIG. 13 is a block diagram of a device for controlling a timed task according to another exemplary embodiment of the present disclosure.

FIG. 13 is a block diagram showing a device for controlling a timed task according to another exemplary embodiment of the present disclosure. As shown in FIG. 13, the present embodiment may be based on the embodiment shown in FIG. 12, and the device may further include an outputting module 830.

The outputting module 830 is configured to output a reminder in a preset manner for reminding a user that the timed task has already been received successfully, after the timed task sent by the first apparatus is received.

In another embodiment provided by the present disclosure, based on the embodiment shown in FIG. 12 or FIG. 13, the first apparatus may include at least one of a server and an intelligent router.

With respect to implementations of functions and actions of respective modules in the above devices, reference may be made to implementations of corresponding steps in the above methods, which will not be elaborated herein.

Since device embodiments are basically corresponding to the method embodiments, for the related parts, reference may be made to partial descriptions of the method embodiments. The above device embodiments are merely exemplary. Units described as separate components may be or may not be physically separated. Components shown as units may be or may not be physical units, in other words, may be located at one position or may be distributed to a plurality of network units. Some or all of the modules may be selected according to actual requirements so as to achieve the objective of the present disclosure. Those skilled in the art may understand and implement the present disclosure without making creative efforts.

Correspondingly, the present disclosure further provides a device for controlling a timed task. The device includes: a processor; and a memory, configured to store instructions executable by the processor; wherein the processor is configured to: receive a timed task, in which the timed task carries an execution time of the timed task; and send the timed task to a second apparatus before the execution time of the timed task.

Correspondingly, the present disclosure further provides a device for controlling a timed task according to another embodiment. The device includes: a processor; and a memory, configured to store instructions executable by the processor; wherein the processor is configured to: receive the timed task sent by the first apparatus, in which the timed task carries an execution time of the timed task; and execute the timed task in response to the execution time.

Figure 14:
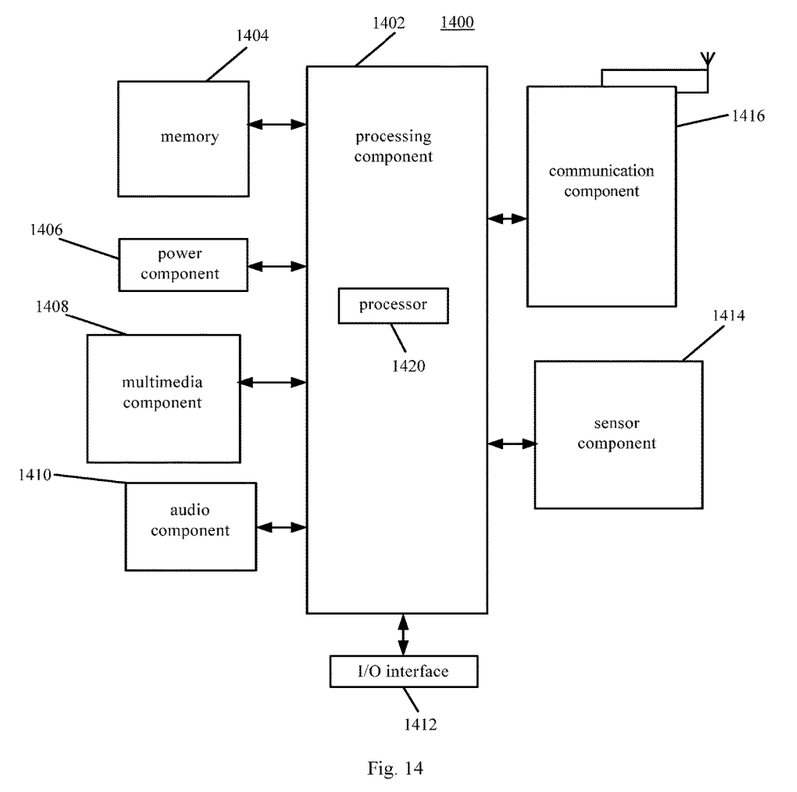
FIG. 14 is a schematic diagram showing a structure of a device for controlling a timed task according to an exemplary embodiment of the present disclosure.

As shown in FIG. 14, FIG. 14 is a schematic diagram showing a structure of a device 1400 for controlling a timed task according to an exemplary embodiment of the present disclosure. For example, the device 1400 may be a smartphone, a computer, a digital broadcasting terminal, a messaging apparatus, a game console, a tablet apparatus, a medical apparatus, a fitness apparatus, a Personal Digital Assistant, an aircraft, etc.

Referring to FIG. 14, the device 1400 may include one or more of the following components: a processing component 1402, a memory 1404, a power component 1406, a multimedia component 1408, an audio component 1410, an input/output (I/O) interface 1412, a sensor component 1414 and a communication component 1416.

The processing component 1402 typically controls overall operations of the device 1400, such as the operations associated with display, data communications, camera operations, and recording operations. The processing component 1402 may include one or more processors 1420 to execute instructions so as to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the device 1400. Examples of such data include instructions for any applications or methods operated on the device 1400, contact data, phonebook data, messages, pictures, videos, etc. The memory 1404 may be implemented using any type of volatile or non-volatile memory device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1408 includes a front camera and/or a rear camera. The front camera and/or the rear camera may receive an external multimedia datum while the device 1400 is in an operation mode, such as a photographing mode or a video mode. Each of the front camera and the rear camera may be a fixed optical lens system or have focus and optical zoom capability.

The audio component 1410 is configured to output and/or input an audio signal. For example, the audio component 1410 includes a microphone ("MIC") configured to receive an external audio signal when the device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an opened/closed status of the device 1400, relative positioning of components (e.g., the display and the keypad) of the device 1400, a change in position of the device 1400 or a component of the device 1400, a presence or absence of user contact with the device 600, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate wired or wireless communication between the device 1400 and other apparatus. The device 1400 can access a wireless network based on a communication standard, such as WiFi, 2G or 3G or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 1404 including instructions, and the instructions are executable by the processor 1420 of the device 1400, for performing the above-described methods. For example, the non-transitory computer-readable storage medium may be a ROM, a RAM (random access memory), a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling a timed task, applied in a first apparatus, the method comprising:
   receiving the timed task, wherein the timed task carries an planned execution time of the timed task, and the planned execution time is a time set by a user for a second apparatus to execute the timed task; and
   sending the timed task to the second apparatus repeatedly before the planned execution time of the timed task.

2. The method according to claim 1, wherein the first apparatus comprises at least one of a server and an intelligent router.

3. The method according to claim 2, wherein the first apparatus is an intelligent router, the intelligent router is communicatively connected with the server, the server is stored with a timed task, and receiving the timed task comprises:
   receiving the timed task sent by the server.

4. The method according to claim 2, wherein the first apparatus is a server; and receiving the timed task comprises:
   receiving the timed task sent by a control terminal, wherein the control terminal is configured to provide a user with an interface for inputting the timed task.

5. The method according to claim 4, further comprising:
   sending the timed task to an intelligent router that is in a same home environment as the second apparatus before the planned execution time of the timed task.

6. A method for controlling a timed task, applied in a second apparatus, the method comprising:
   receiving the timed task sent by a first apparatus, wherein the timed task carries an planned execution time of the timed task, the planned execution time is a time set by a user for the second apparatus to execute the timed task, and the timed task is received before the planned execution time of the timed task;
   executing the timed task when the planned execution time arrives; and
   outputting a reminder in a preset manner for reminding a user that the timed task has already been received successfully, after receiving the timed task sent by the first apparatus.

7. The method according to claim 6, wherein the first apparatus comprises at least one of a server and an intelligent router.

8. A device for controlling a timed task, applied in a first apparatus, the device comprising:
   a processor; and
   a memory, configured to store instructions executable by the processor;
   wherein the processor is configured to:
   receive the timed task, wherein the timed task carries an planned execution time of the timed task, the planned execution time is a time set by a user for a second apparatus to execute the timed task, and the timed task is received before the planned execution time of the timed task; and
   send the timed task to the second apparatus repeatedly before the planned execution time of the timed task.

9. The device according to claim 8, wherein the first apparatus comprises at least one of a server and an intelligent router.

10. The device according to claim 9, wherein the first apparatus is an intelligent router, the intelligent router is communicatively connected with a server, the server is stored with a timed task, and the processor is configured to receive the timed task sent by the server.

11. The device according to claim 9, wherein the first apparatus is a server; and
   the processor is configured to receive the timed task sent by a control terminal, wherein the control terminal is configured to provide a user with an interface for inputting the timed task.

12. The device according to claim 11, wherein the processor is further configured to send the timed task to an intelligent router that is in a same home environment as the second apparatus before the planned execution time of the timed task.

* * * * *